United States Patent
Samara-Rubio et al.

(10) Patent No.: US 7,184,613 B2
(45) Date of Patent: Feb. 27, 2007

(54) PHASE SHIFTING OPTICAL DEVICE WITH DOPANT BARRIER

(75) Inventors: Dean A. Samara-Rubio, San Jose, CA (US); Ling Liao, Santa Clara, CA (US); Dexter W. Hodge, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/328,482

(22) Filed: Jan. 9, 2006

(65) Prior Publication Data

US 2006/0120653 A1    Jun. 8, 2006

Related U.S. Application Data

(62) Division of application No. 10/872,982, filed on Jun. 21, 2004, now Pat. No. 7,035,487.

(51) Int. Cl.
G02F 1/035 (2006.01)
G02F 1/01 (2006.01)
G02B 6/10 (2006.01)

(52) U.S. Cl. ............... 385/3; 385/1; 385/2; 385/39; 385/40; 385/129; 385/130; 385/132; 385/141; 385/142; 385/144

(58) Field of Classification Search ............... 385/3
See application file for complete search history.

(56) References Cited

U.S. PATENT DOCUMENTS 4,093,345 A    6/1978    Logan et al.
4,923,264 A    5/1990    Langer et al.
5,007,062 A    4/1991    Chesnoy
5,027,253 A    6/1991    Lauffer et al.
5,388,106 A    2/1995    Tabuchi
5,661,825 A    8/1997    Van Dam et al.
5,838,844 A    11/1998   Van Dam et al.
5,933,554 A    8/1999    Leuthold et al.
6,052,498 A    4/2000    Paniccia (Continued)

OTHER PUBLICATIONS

Cutolo, A., et al., "Silicon Electro-Optic Modulator Based On A Three Terminal Device. Integrated In A Low-Loss Single-Mode SOI Waveguide," *Journal of Lightwave Technology*, vol. 15, No. 3, (Mar. 1997), pp. 505-518.

(Continued)

*Primary Examiner*—Frank G. Font
*Assistant Examiner*—Ryan Lepisto
(74) *Attorney, Agent, or Firm*—Blakely, Sokoloff, Taylor & Zafman LLP

(57) ABSTRACT

A doped barrier region included in an optical phase shifter is disclosed. In one embodiment, an apparatus according to embodiments of the present invention includes a first region of an optical waveguide and a second region of the optical waveguide. The second region of the optical waveguide includes a higher doped region of material and a lower doped region of material. An insulating region disposed between the first and second regions of the optical waveguide is also included. A first portion the higher doped region is disposed proximate to the insulating region. A dopant barrier region is also included and is disposed between the higher and lower doped regions of the second region of the optical waveguide.

6 Claims, 4 Drawing Sheets

U.S. PATENT DOCUMENTS

| | | | |
|---|---|---|---|
| 6,147,366 | A | 11/2000 | Drottar et al. |
| 6,222,963 | B1 | 4/2001 | Grand et al. |
| 6,278,822 | B1 | 8/2001 | Dawnay |
| 6,298,177 | B1 | 10/2001 | House |
| 6,374,001 | B1 | 4/2002 | Bozeat et al. |
| 6,393,169 | B1 | 5/2002 | Paniccia et al. |
| 6,434,289 | B1 | 8/2002 | Paniccia et al. |
| 6,483,954 | B2 | 11/2002 | Koehl et al. |
| 6,567,444 | B2 | 5/2003 | Hayakawa |
| 6,597,011 | B1 | 7/2003 | Atanackovic |
| 6,600,842 | B2 | 7/2003 | Yamada |
| 6,801,676 | B1 * | 10/2004 | Liu ............................... 385/3 |
| 2002/0051601 | A1 | 5/2002 | Hung |
| 2002/0071621 | A1 | 6/2002 | Yamada |
| 2002/0089711 | A1 | 7/2002 | Conzone et al. |
| 2002/0191886 | A1 | 12/2002 | Castoldi et al. |
| 2003/0002767 | A1 | 1/2003 | Hanneman, Jr. |
| 2003/0112841 | A1 | 6/2003 | Massa et al. |

OTHER PUBLICATIONS

Dainesi, P., et al., "CMOS Compatible Fully Integrated Mach-Zehnder Interferometer In SOI Technology," *IEEE Photonics Technology Letters*, vol. 12, No. 6, (Jun. 2000), pp. 660-662.

Nowak, E.D., et al., "Speed, Power, and Yield Comparison of Thin Bonded SOI versus Bulk CMOS Technologies," *Proceedings 1994 IEEE International SOI Conference*, (Oct. 1994), pp. 41-42.

Salib, Mike, et al., "Silicon Photonics," *Intel Technology Journal*, vol. 8, Issue 2, (May 10, 2004), http://developer.intel.com/technology/itj/index.htm.

* cited by examiner

PHASE SHIFTING OPTICAL DEVICE WITH DOPANT BARRIER

REFERENCE TO PRIOR APPLICATIONS

This application is a divisional of, and claims priority under 35 U.S.C. § 120 from, U.S. patent application Ser. No. 10/872,982, filed Jun. 21, 2004, now issued as U.S. Pat. No. 7,035,487 B2, entitled "Phase Shifting Optical Device With Dopant Barrier".

BACKGROUND OF THE INVENTION

1. Field of the Invention

The present invention relates generally to optics and, more specifically, the present invention relates to phase shifting optical beams.

2. Background Information

The need for fast and efficient optical-based technologies is increasing as Internet data traffic growth rate is overtaking voice traffic pushing the need for optical communications. Transmission of multiple optical channels over the same fiber in the dense wavelength-division multiplexing (DWDM) systems and Gigabit (GB) Ethernet systems provide a simple way to use the unprecedented capacity (signal bandwidth) offered by fiber optics. Commonly used optical components in the system include wavelength division multiplexed (WDM) transmitters and receivers, optical filter such as diffraction gratings, thin-film filters, fiber Bragg gratings, arrayed-waveguide gratings, optical add/drop multiplexers, lasers and optical switches. Optical switches may be used to modulate optical beams. Two commonly found types of optical switches are mechanical switching devices and electro-optic switching devices.

Mechanical switching devices generally involve physical components that are placed in the optical paths between optical fibers. These components are moved to cause switching action. Micro-electronic mechanical systems (MEMS) have recently been used for miniature mechanical switches. MEMS are popular because they are silicon based and are processed using somewhat conventional silicon processing technologies. However, since MEMS technology generally relies upon the actual mechanical movement of physical parts or components, MEMS are generally limited to slower speed optical applications, such as for example applications having response times on the order of milliseconds. In electro-optic switching devices, voltages are applied to selected parts of a device to create electric fields within the device. The electric fields change the optical properties of selected materials within the device and the electro-optic effect results in switching action. Electro-optic devices typically utilize electro-optical materials that combine optical transparency with voltage-variable optical behavior.

BRIEF DESCRIPTION OF THE DRAWINGS

The present invention is illustrated by way of example and not limitation in the accompanying figures.

DETAILED DESCRIPTION

Methods and apparatuses for phase shifting an optical beam with an optical device with reduced optical loss are disclosed. In the following description numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments. In addition, it is appreciated that the figures provided herewith are for explanation purposes to persons ordinarily skilled in the art and that the drawings are not necessarily drawn to scale.

Figure 1:
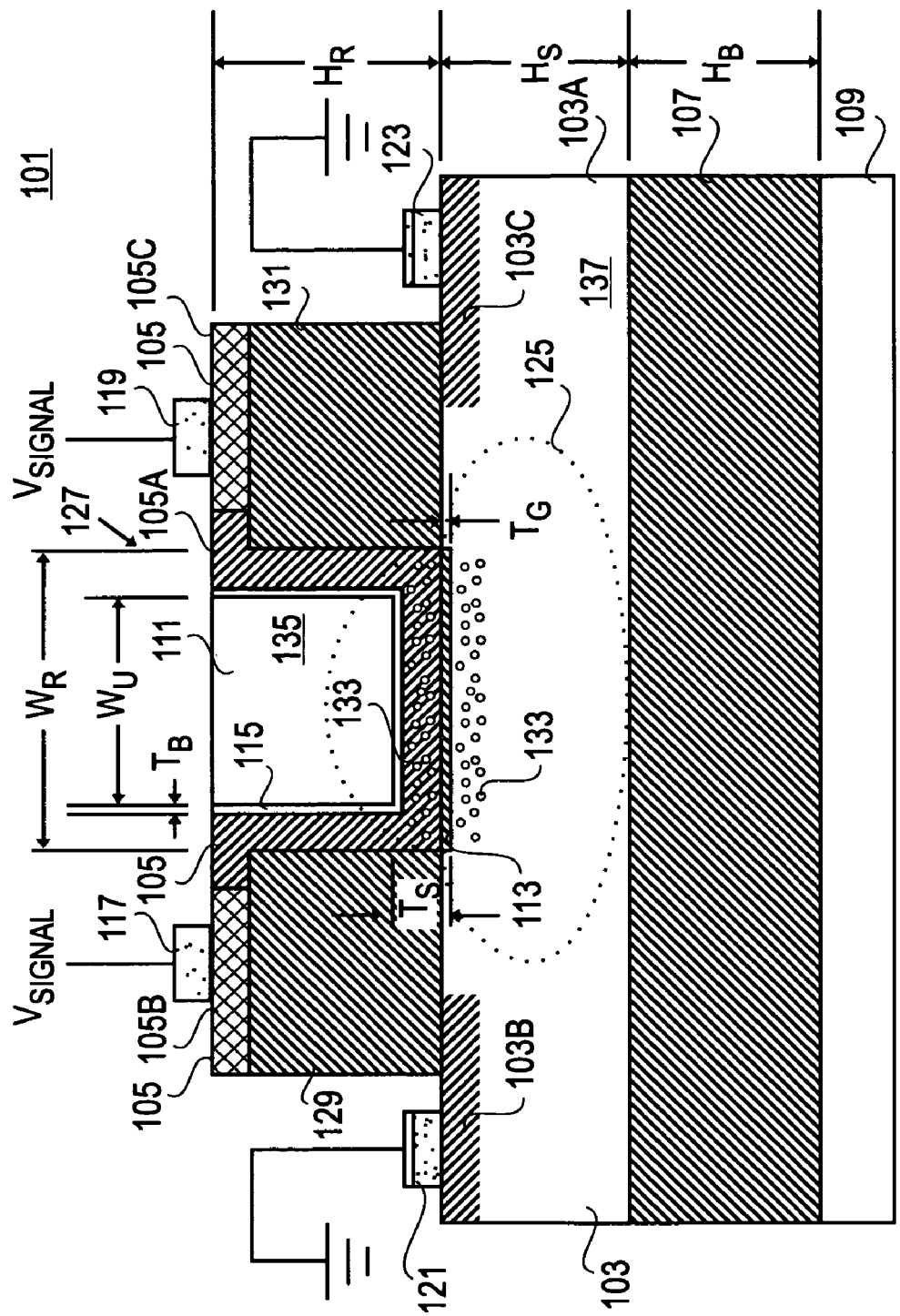
FIG. 1 is a cross-section illustration of one embodiment of an optical device including a dopant barrier disposed between higher and lower doped regions in accordance with the teachings of the present invention.

FIG. 1 is a cross-section illustrating generally one embodiment of an optical device 101 including a dopant barrier 115 in accordance with the teachings of the present invention. In one embodiment, optical device 101 is a semiconductor-based optical device that is provided in a fully integrated solution on a single integrated circuit chip. Embodiments of the disclosed optical devices can be used in a variety of high bandwidth applications including multiprocessor, telecommunications, networking as well as other high speed optical applications such as optical delay lines, switches, modulators, add/drops, or the like.

As shown in FIG. 1, optical device 101 includes a first region of material 103 and a second region of material. In the embodiment depicted in FIG. 1, the second region of material is illustrated as material regions 105 and 111 including a dopant barrier 115 disposed between material regions 105 and 111 in accordance with the teachings of the present invention. In one embodiment, dopant barrier 115 may include a thin layer of silicon nitride, silicon dioxide or other suitable material, which in one embodiment may be deposited or grown in between the material regions 105 and 111 of optical waveguide 127 in accordance with the teachings of the present invention.

In one embodiment, one or more of material 103 and material regions 105 and 111 include semiconductor material, such as for example silicon. For explanation purposes, material 103 and material regions 105 and 111 will be described in this disclosure as including semiconductor materials. Other suitable materials may be utilized in accordance with the teachings of the present invention. In another embodiment, material region 111 may include a material having an index of refraction similar to the index of refraction of material region 105, such as silicon, and provide good transmission of infrared light. For example, in an embodiment in which material region 105 is silicon, material region 111 may include large-grain undoped polysilicon, a dielectric such as hafnium oxide (HfO$_2$), or other suitable materials.

In one embodiment, dopant barrier 115 helps to concentrate the dopant concentration of the second region of semiconductor material in semiconductor material region 105 such that semiconductor material region 105 has a higher dopant concentration than semiconductor material region 111. In one embodiment, semiconductor material region 111 is substantially undoped polysilicon or has a substantially low doping concentration. In one embodiment, the semiconductor material regions may include silicon, polysilicon, or other suitable types of semiconductor material.

In the illustrated embodiment, semiconductor material region 103 is illustrated as having a plurality of portions 103A, 103B and 103C and semiconductor material region 105 is illustrated as having a plurality of portions 105A, 105B and 105C. In one embodiment, the portions 103B and 103C of semiconductor material region 103 have a higher dopant concentration than portion 103A of semiconductor material region 103. Similarly, in one embodiment, the portions 105B and 105C of semiconductor material region 105 have a higher dopant concentration than portion 105A of semiconductor material region 105. In one embodiment, contacts 117 and 119 are coupled to semiconductor material region 105 at portions 105B and 105C, respectively. Similarly, in one embodiment, contacts 121 and 123 are coupled to semiconductor material region 103 at portions 103B and 103C, respectively.

In one embodiment, contacts 117 and 119 are coupled to receive a signal $V_{SIGNAL}$ and contacts 121 and 123 are coupled to ground. In another embodiment, contacts 117 and 119 are coupled to ground and contacts 121 and 123 are coupled to receive a signal $V_{SIGNAL}$. In one embodiment, semiconductor material 103 also includes n-type dopants and semiconductor material 105 includes p-type dopants. In another embodiment, semiconductor material 103 also includes p-type dopants and semiconductor material 105 includes n-type dopants. The polarities of the dopants and voltages are provided in this disclosure for explanation purposes and that the polarities of the dopants and corresponding voltages may be modified or reversed in accordance with the teachings of the present invention.

In one embodiment, an insulating region 113 is disposed between and proximate to semiconductor material regions 103 and 105. In one embodiment, insulating region 113 includes for example SiON, SiO$_2$, or another suitable type of insulating material. As illustrated in FIG. 1, one embodiment of optical device 101 is fabricated on a silicon-on-insulator (SOI) wafer and therefore includes a buried insulating layer 107 and a layer of semiconductor material 109. In one embodiment, buried insulating layer includes for example SiO$_2$ or another suitable type of insulating material between semiconductor material 103 and 109 layers. Insulating region 113 disposed between semiconductor material regions 103 and 105, such that a complementary metal oxide semiconductor (CMOS) capacitive type structure is formed. As shown in FIG. 1, charge carriers in charge regions 133 are formed proximate to insulating region 113 in semiconductor material regions 103 and 105, which form the plates of a capacitor while the insulating region 113 provides the insulator between the "plates." In one embodiment, the concentration of charge carriers in charge regions 133 is modulated in response to $V_{SIGNAL}$ in accordance with the teachings of the present invention.

In one embodiment, an optical waveguide 127 is included in optical device 101, through which an optical beam 125 is directed along an optical path. In the embodiment illustrated in FIG. 1, waveguide 127 is a rib waveguide including a rib region 135 and a slab region 137. In one embodiment, optical beam 125 includes infrared or near infrared light. For example, in one embodiment, optical beam 125 has a wavelength near approximately 1.3 μm or 1.55 μm. In the embodiment illustrated in FIG. 1, the optical path along which optical beam 125 is directed is along an axis that is parallel to the axis of the optical waveguide of optical device 101. In the example shown in FIG. 1, the optical path and therefore optical beam 125 are shown to propagate along a direction going through, or coming in and out of, the page.

As summarized above, one embodiment of semiconductor material region 103 is grounded through contacts 121 and 123 and semiconductor material region 105 is coupled to receive $V_{SIGNAL}$ through contacts 117 and 119. In one embodiment, contacts 113, 115, 117 and 119 are metal contacts that are coupled to semiconductor material regions 103 and 105 at locations outside the optical path or optical mode of optical beam 125. Similarly, the higher doped portions 103B, 103C, 105B and 105C of semiconductor regions 103 and 105 are also disposed at locations outside the optical path or optical mode of optical beam 125. The application of $V_{SIGNAL}$ to optical waveguide 127, as shown in FIG. 1, results in the modulation of free charge carriers in charge regions 133, which is proximate to insulating region 113 and through which optical beam 125 is directed.

In one embodiment, portion 103A of semiconductor material 103 is moderately doped n-type silicon having a doping concentration of, for example, approximately $3\times10^{16}$ cm$^{-3}$. In one embodiment, portion 105A of semiconductor material 105 is moderately doped p-type polysilicon having a doping concentration of, for example, approximately $1\times10^{17}$ cm$^{-3}$. In such an embodiment, higher doped portions 103B and 103C are heavily doped with n++ type dopants and higher doped regions 105B and 105C are heavily doped with p++ type dopants. For example, higher doped regions 105B and 105C in one embodiment are heavily-doped p-type polysilicon have a doping concentration of approximately $1\times10^{19}$ cm$^{-3}$. In one embodiment, the higher doped regions may be made of semiconductor materials such as silicon, polysilicon, silicon germanium, or any other suitable type of semiconductor material. In one embodiment, the inclusion of higher doped portions 103B, 103C, 105B and 105C help improve the electrical coupling of metal contacts 117, 119, 121 and 123 to semiconductor material regions 103 and 105 in accordance with the teachings of the present invention. This improved electrical coupling reduces the contact resistance between metal contacts 117, 119, 121 and 123 and semiconductor material regions 103 and 105, which improves the electrical performance of optical device 101 in accordance with the teachings of the present invention.

In one embodiment, a buffer of insulating material 129 and a buffer of insulating material 131 are also included in an optical device 101 in accordance with the teachings of the present invention. As shown in FIG. 1, buffer 129 is disposed between contact 117 and the optical path or optical mode of optical beam 125. Buffer 131 is disposed between contact 119 and the optical path or optical mode of optical beam 125. In one embodiment, buffers 129 and 131 are made of materials having lower refractive indexes than the refractive index of the core of waveguide 127. As a result, buffers 129 and 131 serve as cladding so as to help confine optical beam 125 to remain within waveguide 127. In the embodiment illustrated in FIG. 1, buried insulating layer 107 also serves as cladding so as to help confine optical beam 125 to remain within waveguide 127. In one embodiment, buffers 129 and 131 also serve as optical and electrical isolators so as to optically isolate metal contacts 117 and 119 from optical beam 125 as well as electrically isolate material 103 from material 105 and electrically isolate the contacts coupled to waveguide 127 from the optical electric field guided from optical beam 125.

In operation, optical beam 125 is directed through optical waveguide 127 along an optical path through charge regions 133. In one embodiment, $V_{SIGNAL}$ is applied to optical waveguide 127 at material region 105 to modulate the free charge carrier concentration in charge regions 133 proximate to insulating region 113. The applied voltage from $V_{SIGNAL}$ changes the free charge carrier density in charge regions 133, which results in a change in the refractive index of the semiconductor material in optical waveguide 127.

In one embodiment, the free charge carriers in charge regions 133 may include for example electrons, holes or a combination thereof. In one embodiment, the free charge carriers may attenuate optical beam 125 when passing through. In particular, the free charge carriers in charge regions 133 may attenuate optical beam 125 by converting some of the energy of optical beam 125 into free charge carrier energy. Accordingly, the absence or presence of free charge carriers in charge regions 133 in response to in response to $V_{SIGNAL}$ will modulate optical beam 125 in accordance with the teachings of the present invention.

In one embodiment, the phase of optical beam 125 that passes through charge regions 133 is modulated in response to $V_{SIGNAL}$. In one embodiment, the phase of optical beam 125 passing through free charge carriers in charge regions 133, or the absence of free charge carriers, in optical waveguide 127 is modulated due to the plasma optical effect. The plasma optical effect arises due to an interaction between the optical electric field vector and free charge carriers that may be present along the optical path of the optical beam 125 in optical waveguide 127. The electric field of the optical beam 125 polarizes the free charge carriers and this effectively perturbs the local dielectric constant of the medium. This in turn leads to a perturbation of the propagation velocity of the optical wave and hence the index of refraction for the light, since the index of refraction is simply the ratio of the speed of the light in vacuum to that in the medium. Therefore, the index of refraction in optical waveguide 127 of optical device 101 is modulated in response to the modulation of free charge carriers in charge regions 133. The modulated index of refraction in the waveguide of optical device 101 correspondingly modulates the phase of optical beam 125 propagating through optical waveguide 127 of optical device 101. In addition, the free charge carriers in charge regions 133 are accelerated by the field and lead to absorption of the optical field as optical energy is used up. Generally the refractive index perturbation is a complex number with the real part being that part which causes the velocity change and the imaginary part being related to the free charge carrier absorption. The amount of phase shift ϕ is given by $$\phi = (2\pi/\lambda)\Delta nL \quad \text{(Equation 1)}$$

with the optical wavelength λ, the refractive index change Δn and the interaction length L. In the case of the plasma optical effect in silicon, the refractive index change Δn due to the electron ($\Delta N_e$) and hole ($\Delta N_h$) concentration change is given by:

$$\Delta n = -\frac{e^2\lambda^2}{8\pi^2c^2\varepsilon_0 n_0}\left(\frac{b_e(\Delta N_e)^{1.05}}{m_e^*} + \frac{b_h(\Delta N_h)^{0.8}}{m_h^*}\right) \quad \text{(Equation 2)}$$

where $n_0$ is the nominal index of refraction for silicon, e is the electronic charge, c is the speed of light, $\varepsilon_0$ is the permittivity of free space, $m_e^*$ and $m_h^*$ are the electron and hole effective masses, respectively, $b_e$ and $b_h$ are fitting parameters.

In one embodiment, the dimensions of optical waveguide 127 are designed to accommodate a single mode for optical beam 125. For instance, in one embodiment, the width $W_R$ of the rib region 135 of optical waveguide 127 is approximately 1.8 μm, the height $H_R$ of the rib region 135 of optical waveguide 127 is approximately 1.0 μm and the height $H_S$ of the slab region 137 of optical waveguide 127 is approximately 0.9 μm. In one embodiment, the height $H_B$ of the buried insulating layer 107 is approximately 0.9 μm the thickness $T_G$ of the insulating region 113 is approximately 6 nm. In one embodiment, the thickness $T_B$ of dopant barrier 115 is less than or equal to approximately 10 nm and the width $W_U$ of semiconductor material region 111 is approximately 1.3 μm. In one embodiment, the resulting stack of dopant barrier 115, semiconductor material 105 and insulating region 113 has a stack thickness $T_S$ of approximately 0.10 to 0.25 μm. These dimensions of one embodiment are provided in this disclosure for explanation purposes and that other dimensions may be utilized in accordance with the teachings of the present invention.

Optical insertion loss is often dominated by the absorption and scattering that occurs in the doped semiconductor materials. By concentrating the dopants in semiconductor material 105 with dopant barrier 115, optical insertion loss of optical waveguide 127 is reduced in accordance with the teachings of the present invention. As a result, device performance of optical device 101 as given for example by the ratio of device speed/device optical loss is improved.

Figure 2:
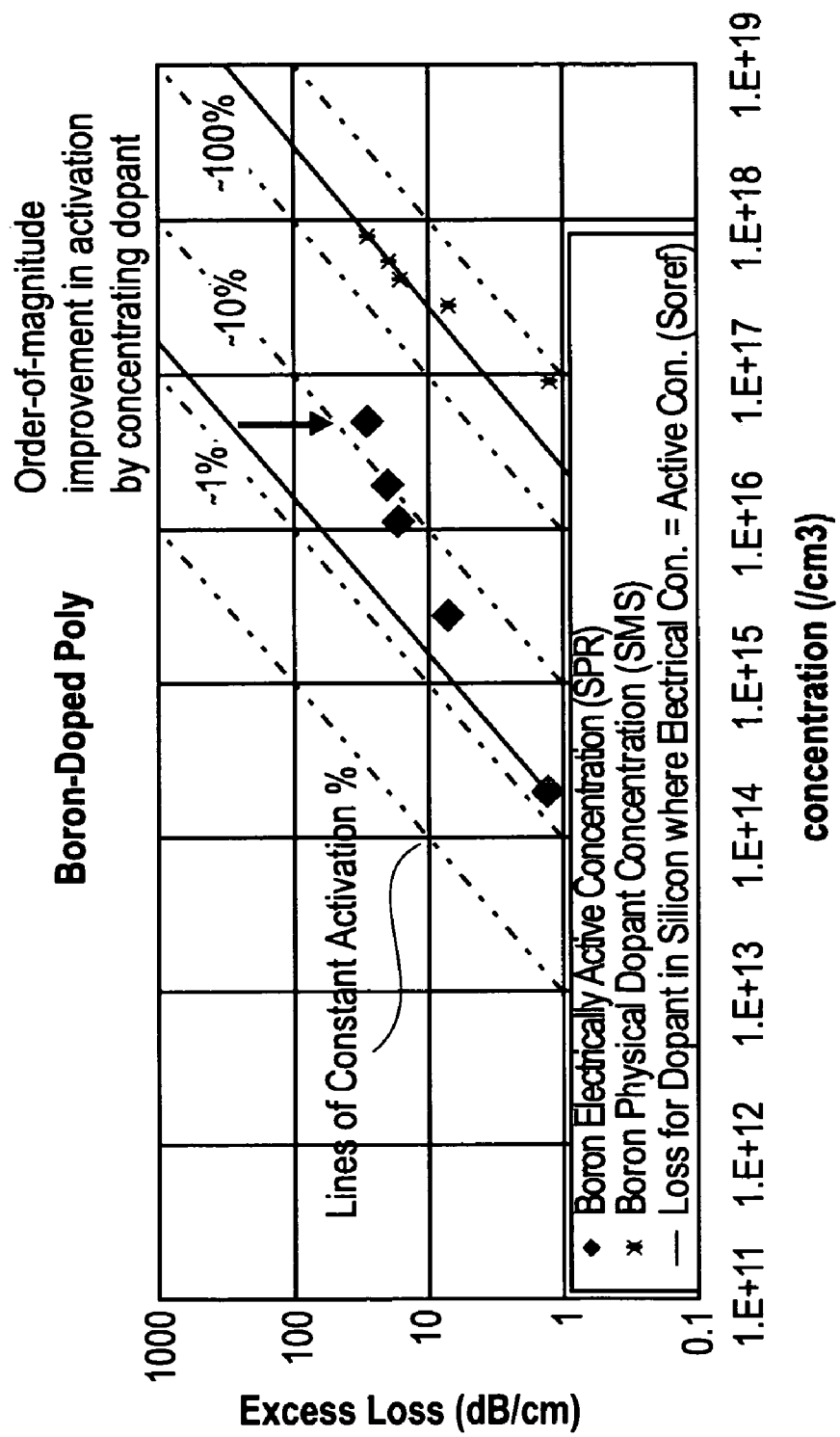
FIG. 2 is a plot illustrating one embodiment of a relationship of optical absorption versus physical dopant concentration for bulk large-grain Boron-doped polysilicon in accordance with the teachings of the present invention.

For instance, FIG. 2 is a diagram showing optical absorption or loss versus physical dopant concentration for bulk large-grain Boron-doped polysilicon. When moving from low doping to high doping, the conductivity increases more rapidly than the optical loss. As can be observed from the plots showing boron electrically active concentration (SPR) and boron physical dopant concentration (SIMS), there is an order of magnitude improvement in activation by concentrating dopant in accordance with the teachings of the present invention. Therefore, a figure of merit for the material, for example electrical conductivity of material/optical loss of material, increases with increasing dopant concentration. Since dopant barrier 115 has the effect of concentrating dopants in semiconductor material 105 proximate to insulating region 113 according to embodiments of the present invention, an improved ratio of electrical conductivity of material/optical loss of material is realized in accordance with the teachings of the present invention.

In addition, with dopant barrier 115 disposed between semiconductor material regions 105 and 111 as shown, a substantial portion of the doped semiconductor material of semiconductor material 105 is disposed along a periphery of optical waveguide 127 in lower-intensity regions of the optical mode of optical beam 125 in optical waveguide 127.

Indeed, as can be observed from the embodiment shown in FIG. 1, the portions of semiconductor material 105 that are proximate to buffers 129 and 131 that are disposed along the periphery of optical waveguide 127 are substantially outside the optical path or optical mode of the optical beam 125 in accordance with the teachings of the present invention. As a result, the effectiveness of dopant barrier 115 disposed between semiconductor material regions 105 and 111 as shown is further enhanced because optical loss in optical waveguide 127 is further reduced because the optical mode intensity decreases substantially near the periphery of optical waveguide 127 near the interface between semiconductor material 105 and buffers 129 and 131.

Figure 3:
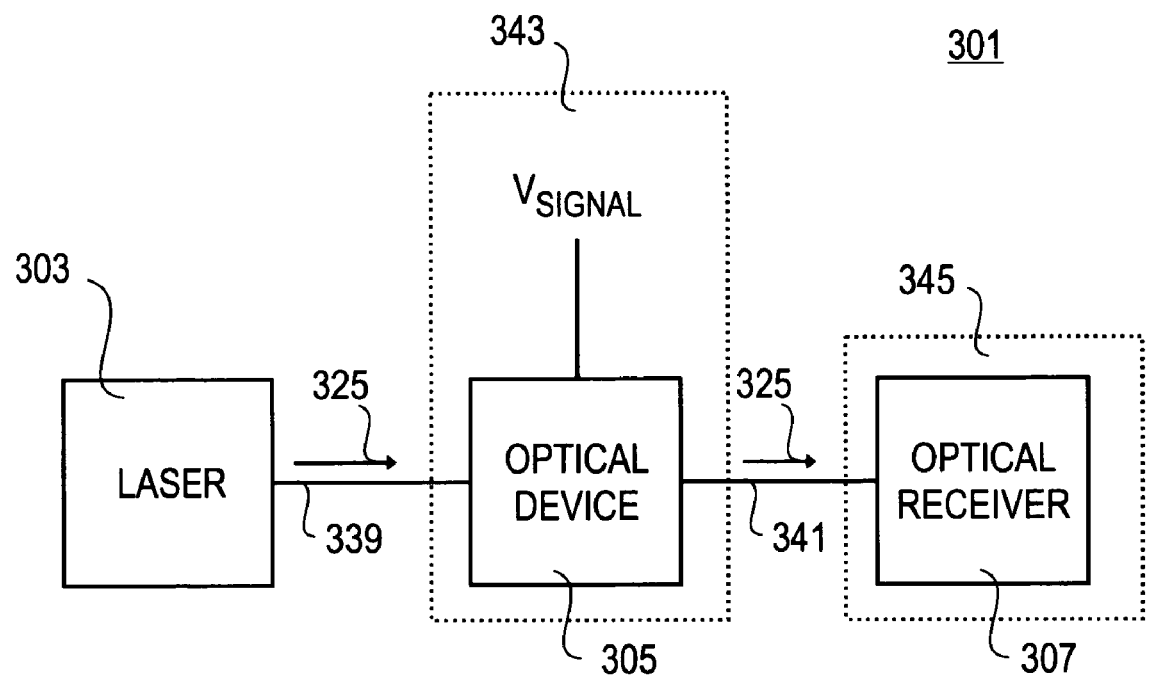
FIG. 3 is a block diagram illustration of one embodiment of a system including an optical transmitter and an optical receiver with an optical device including one embodiment of an optical phase shifter according to embodiments of the present invention.

FIG. 3 illustrates generally a block diagram of one embodiment of a system including an optical transmitter and an optical receiver with an optical device including an optical phase shifter according to embodiments of the present invention. For example, optical device 305 may include optical device 101 of FIG. 1 or optical modulator 401 of FIG. 4. In particular, FIG. 3 shows optical system 301 including a laser 303 and an optical receiver 307. In one embodiment, optical system 301 also includes an optical device 305 optically coupled between laser 303 and optical receiver 307 through optical fiber 339 and optical 341. In one embodiment, laser 303 transmits a laser beam 325 that is received by optical device 305 through an optical conduit 339. In one embodiment, optical receiver is optically coupled to optical device 305 to receive laser beam 325 through an optical conduit 341. In one embodiment, optical conduits 339 and 341 may include for example optical fibers, optical waveguides, free space or other suitable optical conduits.

In one embodiment, system 301 may be included in a single computer system with laser 303, an optical device 305 and optical receiver 307 being included in internal components of the computer system. For example, in one embodiment, system 301 may be a computer system, such as for example a personal or laptop computer, with optical device 305 included in a processor 343 of the computer system and optical receiver 307 being included in for example an internal card 345 of the computer system, such as for example a video controller card, a network interface card, memory or the like. In such an embodiment, optical communications are provided between the processor 343 that includes optical device 305 and the internal card 345 that includes optical receiver 307. In another embodiment, system 301 may be included in a single chip or chipset with laser 303 and optical receiver 307 being internal components of the chip or chipset. In still another embodiment, system 301 may be included in a communications network with laser 303 and optical receiver 307 being included in separate components of the communications network.

In one embodiment, optical device 305 may include for example a device such as optical device 101 described above to phase shift laser beam 325 in response to signal $V_{SIGNAL}$. In such an embodiment, optical device 305 may serve as for example an optical delay. In another embodiment, optical device 305 may be employed in an optical amplitude modulator or the like. In various embodiments according to the teachings of the present invention, optical device 305 can be designed with scaled down waveguide dimensions to operate at high speeds without excessive optical loss as discussed above.

Figure 4:
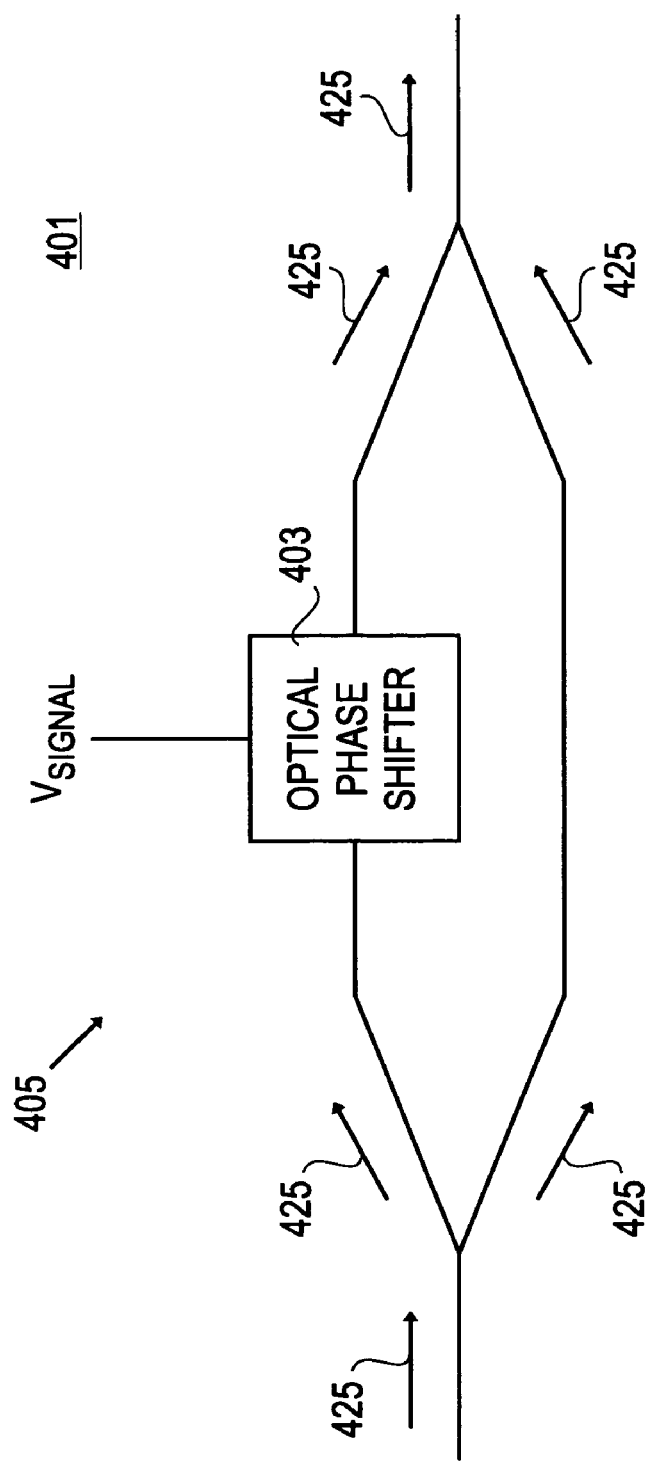
FIG. 4 is a block diagram illustration of one embodiment of an optical modulator including a Mach Zehnder Interferometer (MZI) having one embodiment of an optical phase shifter according to embodiments of the present invention.

FIG. 4 illustrates generally one embodiment of an optical modulator 401 that can be included in optical device 305 of FIG. 3. As shown in the depicted embodiment, optical modulator 401 includes an optical phase shifter 403 in at least one of the two arms optically coupled between cascaded Y-branch couplers of a Mach-Zehnder Interferometer (MZI) configuration 405 disposed in semiconductor material. In one embodiment, optical phase shifter 403 is similar to an embodiment of optical device 101 described above.

In operation, an optical beam 425 is directed into an input of MZI configuration 405. Optical beam 425 is split such that a first portion of the optical beam 425 is directed through one of the arms of the MZI configuration 405 and a second portion of optical beam 425 is directed through the other one of the arms of the MZI configuration 405. As shown in the depicted embodiment, one of the arms of the MZI configuration 405 includes optical phase shifter 403, which adjusts a relative phase difference between the first and second portions of optical beam 425 in response to signal $V_{SIGNAL}$. In one embodiment, the first and second portions of optical beam 425 are then merged in the semiconductor substrate such that optical beam 425 is modulated at the output of MZI configuration 405 as a result of constructive or destructive interference. In one embodiment, as shown, one of the arms of the MZI configuration 405 includes an optical phase shifter 403. In another embodiment, both of the arms of the MZI configuration 405 may include an optical phase shifter 403 in accordance with the teachings of the present invention. In various embodiments according to the teachings of the present invention, optical phase shifter 403 can be designed with scaled down waveguide dimensions and non-uniform doping concentrations and profiles operate at high speeds such as for example 10 GHz and beyond without excessive optical loss is discussed above.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. A method, comprising:
    directing an optical beam along an optical path through an optical waveguide;
    modulating a concentration of free charge carriers in a charge modulated region along the optical path to phase shift the optical beam; and
    concentrating dopants in the optical waveguide proximate to an insulating region disposed between first and second regions of the optical waveguide and along a periphery of the optical waveguide to confine the dopants in the optical waveguide with a dopant barrier region disposed between higher and lower doped regions of the second region of the optical waveguide to reduce optical loss of the optical beam.

2. The method of claim 1 wherein modulating the concentration of free charge carriers in the charge modulated region comprises modulating the concentration of free charge carriers proximate to the insulating region disposed between the first and second regions of the optical waveguide.

3. The method of claim 1 further comprising improving an electrical coupling between a first contact and the optical waveguide with a first higher doped portion of the second region of the optical waveguide coupled to the first contact.

4. The method of claim 3 further comprising isolating the first contact from the optical path through which the optical beam is directed with a first buffer of insulating material disposed along the optical waveguide between the first contact and the optical path of the optical beam.

5. The method of claim 4 further comprising improving an electrical coupling between a second contact and the optical waveguide with a second higher doped portion of the second region of the optical waveguide coupled to the second contact.

6. The method of claim 5 further comprising isolating the second contact from the optical path through which the optical beam is directed with a second buffer of insulating material disposed along the optical waveguide between the second contact and the optical path of the optical beam.

* * * * *